(12) United States Patent
DaCosta

(10) Patent No.: US 6,564,286 B2
(45) Date of Patent: May 13, 2003

(54) NON-VOLATILE MEMORY SYSTEM FOR INSTANT-ON

(75) Inventor: Behram Mario DaCosta, San Jose, CA (US)

(73) Assignees: Sony Corporation, Tokyo (JP); Sony Electronics, Park Ridge, NJ (US)

( * ) Notice: Subject to any disclaimer, the term of this patent is extended or adjusted under 35 U.S.C. 154(b) by 13 days.

(21) Appl. No.: 09/801,531

(22) Filed: Mar. 7, 2001

(65) Prior Publication Data

US 2002/0129191 A1 Sep. 12, 2002

(51) Int. Cl.$^7$ ............................................... G06F 12/00
(52) U.S. Cl. ....................... 711/103; 711/101; 711/107; 711/117; 711/118
(58) Field of Search ........................... 711/8, 101, 103, 711/107, 117, 118

(56) References Cited

U.S. PATENT DOCUMENTS

| | | | | |
|---|---|---|---|---|
| 5,586,081 A | * | 12/1996 | Mills et al. | 365/230.02 |
| 5,764,945 A | * | 6/1998 | Ballard | 711/113 |
| 5,860,083 A | * | 1/1999 | Sukegawa | 711/103 |
| 6,091,640 A | * | 7/2000 | Kawahara et al. | 365/185.22 |
| 6,026,465 A1 | * | 11/2001 | Mills et al. | 711/103 |
| 6,320,782 B1 | * | 11/2001 | Takashima | 365/145 |
| 6,385,688 B1 | * | 5/2002 | Mills et al. | 711/100 |

* cited by examiner

*Primary Examiner*—T. J. Nguyen
(74) *Attorney, Agent, or Firm*—Wagner, Murabito, Hao LLP

(57) ABSTRACT

A computer system using non-volatile main memory in lieu of random access memory (RAM). The non-volatile main memory stores operating system software and application software used by the central processing unit (CPU) when the computer system is operating after bootup. The operating system and application software used by the computer after bootup are retained in an initialized and executable state within the non-volatile main memory when the computer is powered off. As a result, the time to bootup the computer is reduced because the operating system and application software do not need to be copied into a memory element (e.g., RAM) and initialized into an executable state. Also, applications can be opened more quickly during normal operation, and the computer can be shut down more quickly. Performance of the computer can also be improved by using non-volatile memory for the secondary level memory cache and/or the CPU registers.

15 Claims, 3 Drawing Sheets

NON-VOLATILE MEMORY SYSTEM FOR INSTANT-ON

BACKGROUND OF THE INVENTION

1. Field of the Invention

The present invention relates to general purpose computer systems. More specifically, the present invention pertains to a computer system that uses non-volatile memory in lieu of volatile (random access) memory.

2. Related Art

In addition to memory devices such as magnetic disks and optical disks, a computer system primarily uses two types of memory: random access memory (RAM) and read only memory (ROM). ROM is used for permanent storage of software and data that are loaded at the time of manufacture, for example, and are not modifiable by the user. Because ROM can only be read, there is no line into ROM for allowing a write transaction. RAM, on the other hand, can be written to and read from.

Memory locations in RAM can be written to or read from in any order at any time, while ROM contents are wired into fixed memory locations, and cannot be written over. The control logic used by processors to interact with RAM is relatively simple and direct compared to the control logic for retrieving information from ROM, and so memory access times for ROM are usually longer than those for RAM. Also, the different ways that information is stored in ROM versus RAM also contribute to longer memory access times for ROM relative to RAM. Consequently, program execution and data processing take place in RAM in order to improve performance.

The computer system's main memory (also referred to as main storage, primary storage, core, or core storage) thus uses RAM. The memory registers used by the central processing unit (the registers on the processor chip) are also RAM. Many computers also employ a hierarchical memory structure with one or more levels of memory cache between main memory RAM and the central processing unit (CPU) registers. These memory caches also utilize RAM.

However, RAM can only be used to temporarily store information; once power to RAM is turned off (e.g., when the computer system is powered off), the information in RAM is lost. Therefore, during bootup of the computer system, or during initialization of a software application, the contents of ROM memory or disk memory (e.g., the computer system's "hard drive") are copied to RAM memory, and the RAM copy is used instead of the ROM or hard drive contents for data processing and program execution.

A disadvantage to the prior art is that the time it takes to copy ROM contents to RAM during bootup can be relatively long, and is likely to increase in length as operating systems and software applications grow in complexity and size. After bootup, the user is subjected to additional delays while waiting for software applications to be loaded from ROM (or the hard drive) and made ready for use. At shutdown, information and data stored in RAM during operation are backed up in non-volatile memory (e.g., the hard drive), and this can subject the user to further delays.

It is possible to avoid delays associated with bootup and shutdown and with opening applications by not powering off the computer system, thus preserving the information loaded into RAM. However, this is not a viable solution for mobile, portable devices (personal digital assistants, laptops, and the like) that depend on batteries for power. Nor is it a solution for devices powered from a wall outlet, because leaving a device on at all times wastefully consumes power.

Another disadvantage to the prior art is associated with the sudden (unexpected) loss of power to the computer system. In this situation, any information residing in RAM and not saved to disk may be lost and may not be retrievable.

SUMMARY OF THE INVENTION

Thus, a need exists for a system and/or method that can address user issues with the amount of time it takes to bootup and shutdown a computer system and to open applications used by the computer system.

The present embodiment of the present invention pertains to a computer system that uses non-volatile memory in lieu of volatile memory, e.g., random access memory (RAM). In one embodiment, the main memory is non-volatile and stores operating system software and application software used by the central processing unit (CPU) when the computer system is operating after bootup. The operating system and application software remain resident in the non-volatile main memory while they are being used; that is, they are not copied to RAM. Furthermore, in accordance with the present invention, the operating system software and application software used by the computer system after bootup are retained in an initialized and executable state within the non-volatile main memory when the computer system is powered off.

In one embodiment, the second level memory cache used by the computer system uses non-volatile memory. In another embodiment, the CPU registers use non-volatile memory.

In one embodiment, FeRAM (ferromagnetic or farroelectronic RAM) is used for non-volatile memory. In another embodiment, flash memory is used for non-volatile memory.

In summary, the present invention introduces the use of non-volatile memory for main system memory, cache memory, and/or memory registers, including CPU registers. As such, the time to bootup the computer system and open an application can be reduced because, respectively, the operating system and application software do not need to be copied into RAM and initialized into an executable state. The time to shutdown the computer system can also be reduced because it is not necessary to back up information from RAM to non-volatile memory.

These and other advantages of the present invention not specifically mentioned above will become clear within discussions of the present invention presented herein.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations. These descriptions and representations are the means used by those skilled in the art to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated.

Unless specifically stated otherwise as apparent from the following discussions, it is appreciated that throughout the present invention, discussions utilizing terms such as "executing," "booting up," "shutting down," "storing," "operating," "copying" or the like, refer to actions and processes (e.g., process 300 of FIG. 3) of an electronic device, such as a computer system or similar electronic computing device that manipulates and transforms data represented as physical (electronic) quantities within the computer system's registers and memories into other data similarly represented as physical quantities within the computer system memories or registers or other such information storage, transmission or display devices.

Figure 1:
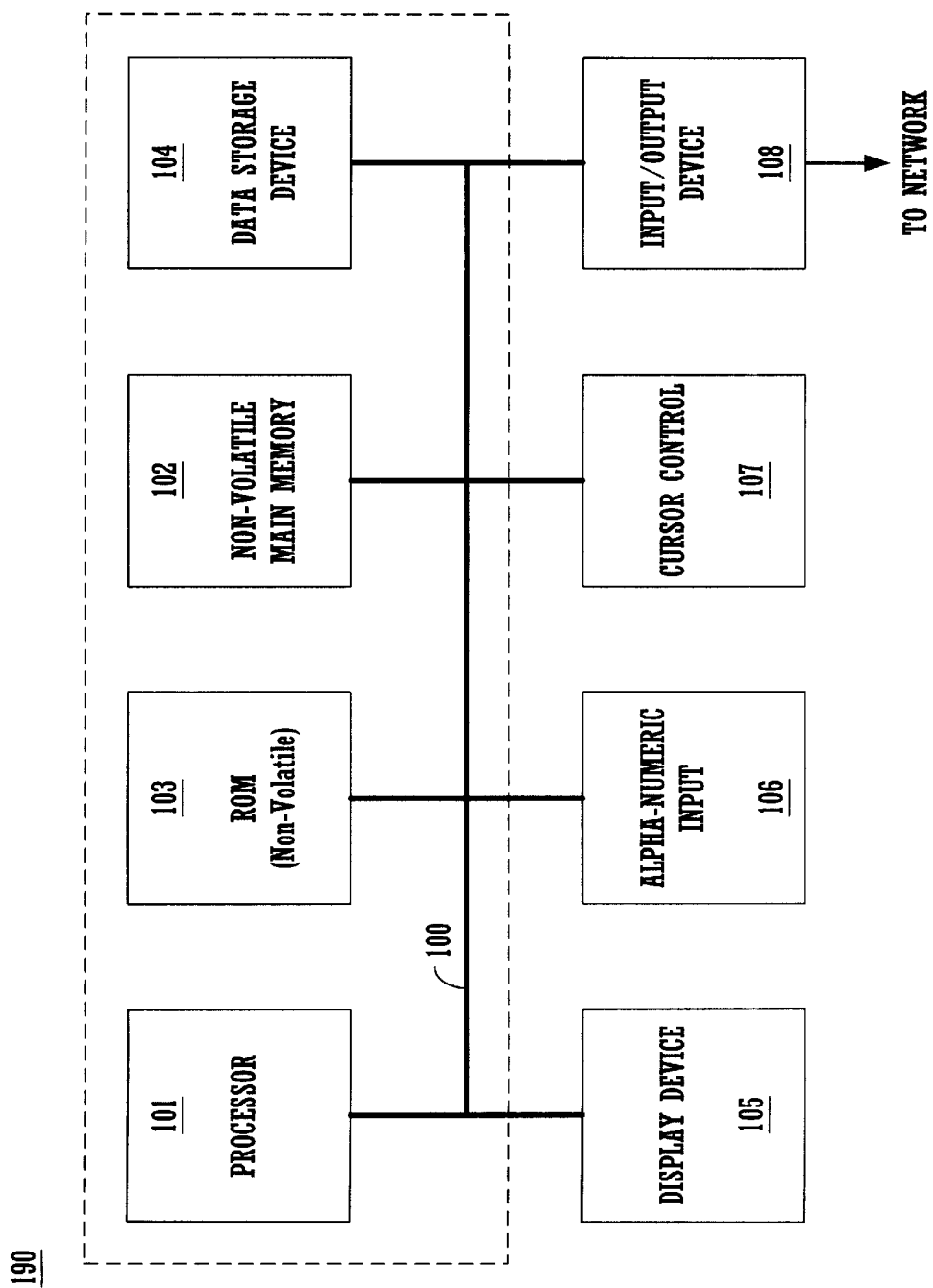
FIG. 1 is a block diagram of one embodiment of a computer system in accordance with the present invention.

Refer now to FIG. 1, which illustrates one embodiment of a computer system 190 in accordance with the present invention. Computer system 190 is described as a desktop, laptop or notebook computer system; however, it is contemplated that aspects of the present invention can be implemented on other types of computer systems such as portable computer systems (e.g., palmtops, hand-helds, personal digital assistants, and the like). Furthermore, aspects of the present invention can be implemented on so-called Internet appliances; that is, those devices that connect with remote sites and execute software stored at the remote site.

In general, computer system 190 comprises bus 100 for communicating information, central processing unit (CPU), or processor, 101 coupled with bus 100 for processing information and instructions, read-only (non-volatile) memory (ROM) 103 coupled with bus 100 for storing static information and instructions for processor 101, data storage device 104 such as a magnetic or optical disk and disk drive coupled with bus 100 for storing information and instructions, an optional user output device such as display device 105 coupled to bus 100 for displaying information to the computer user, an optional user input device such as alphanumeric input device 106 including alphanumeric and function keys coupled to bus 100 for communicating information and command selections to processor 101, and an optional user input device such as cursor control device 107 coupled to bus 100 for communicating user input information and command selections to processor 101. Furthermore, an input/output device 108 (or another type of communication interface) can be used to couple computer system 190 onto the Internet, an Intranet, a local area network, or the like, via either a wired or wireless connection.

Display device 105 utilized with computer system 190 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Aspects of the present invention can also be implemented on so-called "embedded devices" that May not include one or more of the elements of computer system 190. For example, the present invention may be implemented on an embedded device that does not include a display device 105, or it may be implemented on a device that does not include an alphanumeric input device 106.

Significantly, in accordance with one embodiment of the present invention, computer system 190 includes non-volatile main memory 102. In the present embodiment, non-volatile main memory 102 is used in lieu of a random access memory (RAM) unit as the primary, or main, memory (also referred to as main storage, primary storage, core, or core storage). ROM 103 may include read-only instructions and the like, while non-volatile main memory 102 may include operating system software and application software that are used by computer system 190 during bootup and while operating after bootup. Furthermore, non-volatile main memory 102 can be read from and written to. It is appreciated that ROM 103 and non-volatile main memory 102 may be separate elements or integrated as a single element.

In accordance with the present invention, non-volatile memory can be used in place of RAM virtually everywhere in computer system 190, including processor 101. In one embodiment, non-volatile memory is used in the CPU registers (see FIG. 2, below). In another embodiment, non-volatile memory is used in secondary memory cache (refer also to FIG. 2). Because the response speed of non-volatile memory inside processor 101 (e.g., the CPU registers) and memory cache can be of greater significance than the response time of non-volatile main memory 102, and because the CPU registers and memory cache are smaller in size than non-volatile memory 102, it may be more cost-beneficial to incorporate non-volatile memory only into the CPU registers and memory cache.

Figure 2:
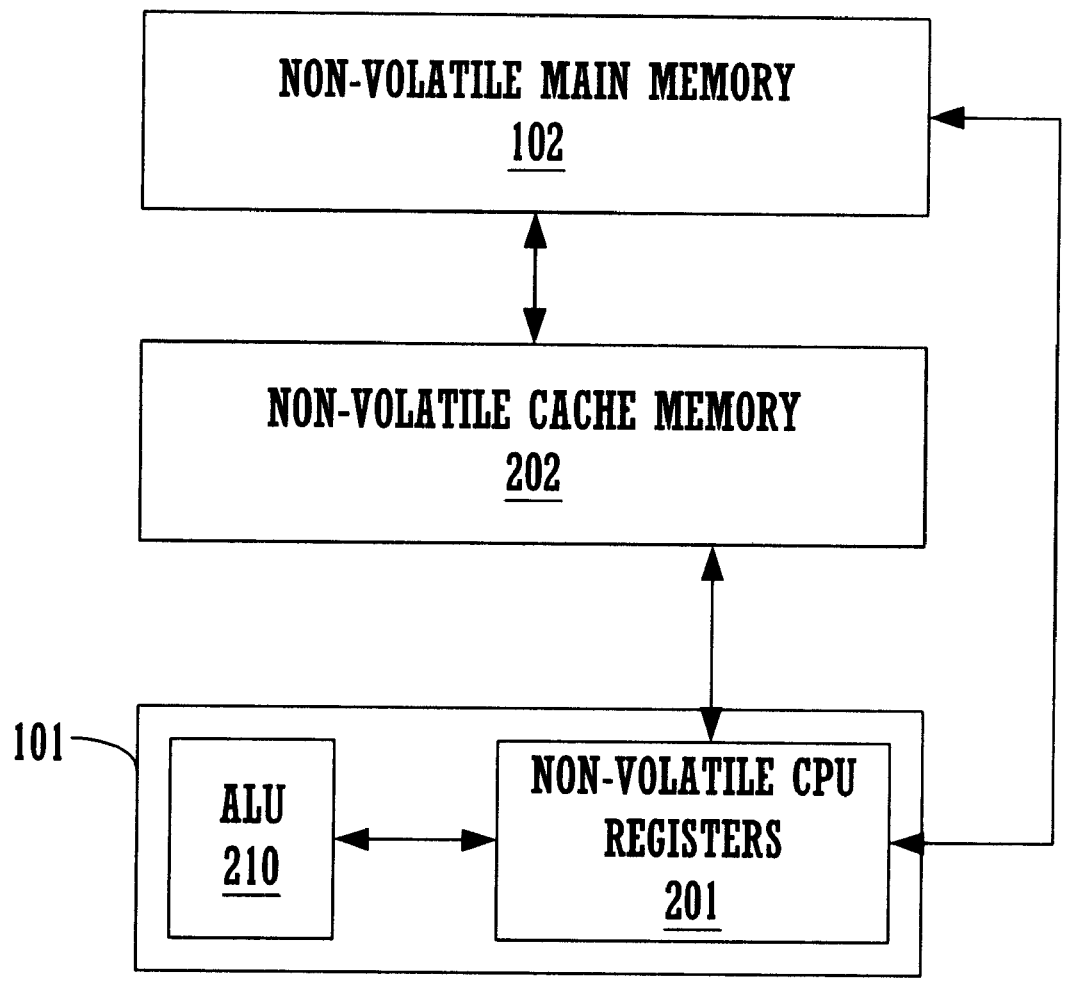
FIG. 2 is a block diagram illustrating a memory hierarchy for a computer system in accordance with one embodiment of the present invention.

FIG. 2 is a block diagram illustrating a memory hierarchy for a computer system (e.g., computer system 190 of FIG. 1) in accordance with one embodiment of the present invention. Non-volatile main memory 102 functions as the primary workspace of computer system 190 and can include the operating system software and application software used by computer system 190 during and after bootup (during normal operation). In this embodiment, non-volatile cache memory 202 is a smaller memory element for storing portions of the operating system and application software, in order to enable more rapid access to those portions by the processor 101. Also in this embodiment, non-volatile CPU registers 201 are memory registers situated on the CPU chip (e.g., on processor 101). Arithmetic logic unit (ALU) 210 is responsible for the arithmetic and logic operations executed by processor 101.

Significantly, in accordance with one embodiment of the present invention, non-volatile main memory 102, cache memory 202 and CPU registers 201 utilize non-volatile memory hardware. As such, information stored in non-volatile main memory 102, cache memory 202 and CPU registers 201 is retained therein when computer system 190 is shutdown or when power is otherwise lost. It is appreciated that, in other embodiments, non-volatile memory can be utilized only in main memory 102, cache memory 202 or CPU registers 201, or any combination thereof. That is, non-volatile memory may be utilized in one or more of these elements but not the other(s).

In one embodiment, FeRAM (ferromagnetic or ferroelectronic RAM) is used for non-volatile main memory 102, cache memory 202 and/or CPU registers 201. FeRAM is a non-volatile semiconductor or magnetic memory technology that retains its contents without power. In another embodiment, flash memory is used for non-volatile main memory 102, cache memory 202 and/or CPU registers 201. Various other types of non-volatile memory can also be used for non-volatile main memory 102, cache memory 202 and/or CPU registers 201.

In the present embodiment, processor 101 interacts with either or both non-volatile main memory 102 and non-volatile cache memory 202, as well as with CPU registers 201. In accordance with the present invention, the controlling logic executed by processor 101 enables the processor to read from and write to non-volatile memory. Controlling logic is also developed to allow other components to interface with non-volatile main memory 102, cache memory 202 and/or CPU registers 201. Thus, the use of non-volatile memory in main memory 102, cache memory 202 and/or CPU registers 201 occurs transparently to the processor 101 and any other interfacing components. In one embodiment, the controlling logic is implemented in hardware. In another embodiment, the controlling logic is implemented in a programmable array logic (PAL).

Figure 3:
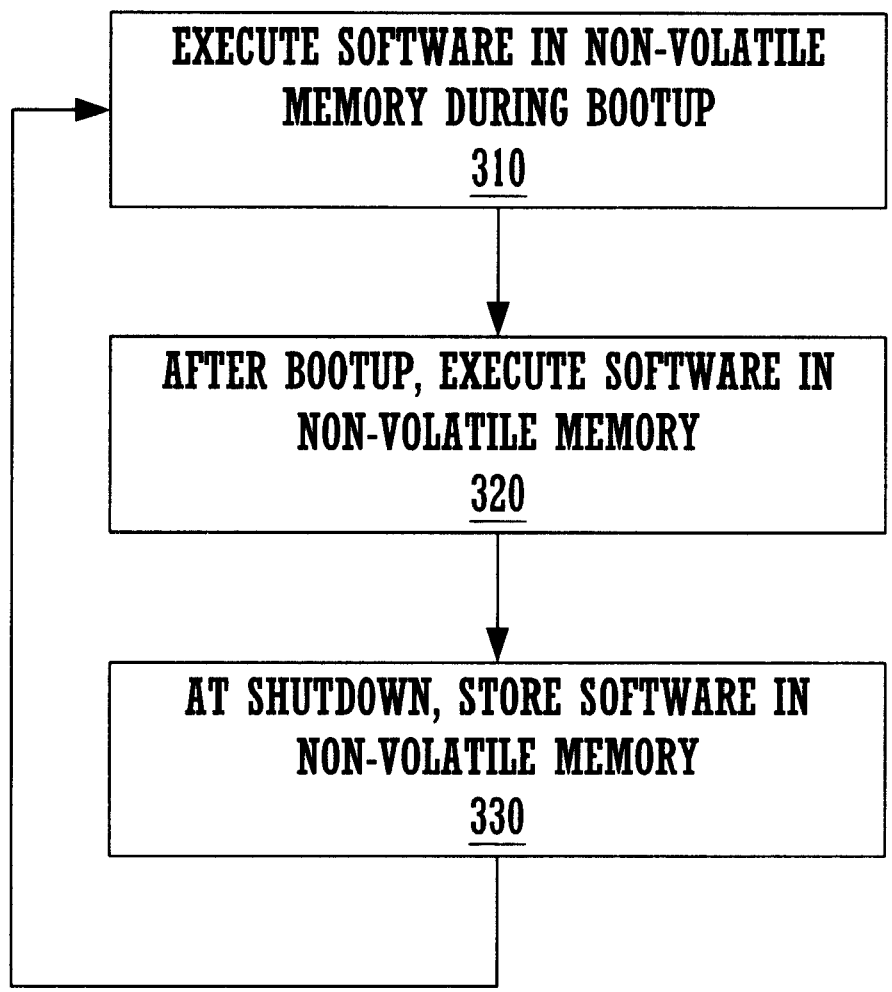
FIG. 3 is a flowchart oft he steps in a process for booting up and operating a computer system in accordance with one embodiment of the present invention.

FIG. 3 is a flowchart of the steps in a process 300 for booting up and operating a computer system 190 (FIG. 1) in accordance with one embodiment of the present invention.

In step 310 of FIG. 3, with reference also to FIGS. 1 and 2, during bootup of computer system 190, software (such as operating system software) is read from non-volatile main memory 102 (and possibly also from CPU registers 201 and cache memory 202) and executed. In accordance with the present embodiment of the present invention, the software is executed while residing in non-volatile main memory 102, using non-volatile memory cache 202 and CPU registers 201 as needed. That is, the software is not copied to another memory element (specifically, to a RAM element) for execution. Because it is not necessary to copy the software from ROM 103 or data storage device 104 to another memory element during bootup, the bootup process can be accomplished more quickly, for the user's benefit and convenience.

In step 320 of FIG. 3, again with reference to FIGS. 1 and 2, during normal operation of computer system 190 (that is, after bootup of the computer system is accomplished), software is read from non-volatile memory 102 and executed. In addition, information generated during normal operation (e.g., user input) is written to non-volatile memory 102.

In accordance with one embodiment of the present invention, the software executed during normal operation is executed while residing in non-volatile main memory 102, using non-volatile memory cache 202 and CPU registers 201 as needed. That is, the software is not copied to another memory element (specifically, to a RAM element) for execution. Because it is not necessary to copy the software from ROM 103 or data storage device 104 to another memory element prior to execution, the software can be used more quickly. For example, an application can be opened and used more rapidly, benefiting the user.

In step 330 of FIG. 3, with reference still to FIGS. 1 and 2 as well, when computer system 190 is shut down (powered off), the operating system and application software are retained in non-volatile main memory 102 (as well as non-volatile memory cache 202 and perhaps non-volatile CPU registers 201). Accordingly, because information does not need to be read back to data storage device 104, the shutdown process can occur more quickly. Also, the information retained in the non-volatile memory elements (such as non-volatile main memory 102) is available during a subsequent bootup of computer system 190, allowing bootup to also be accomplished more quickly as described above in conjunction with step 310. Also, applications opened during normal operation (step 320) are also available more quickly when subsequently used.

In addition, should computer system 190 be shut down unexpectedly, information generated during normal operation would not be lost and can be subsequently retrieved.

In summary, the present invention provides a system and method thereof that address user issues with the amount of time it takes to bootup and shutdown a computer system 190 (FIG. 1) and to open applications used by the computer system. The present invention introduces the use of non-volatile memory for main system memory 102, cache memory 202, and/or memory registers, including CPU registers 201 (FIG. 2). As such, the time to bootup computer system 190 or open an application can be reduced because, respectively, the operating system and application software do not need to be copied into RAM and initialized into an executable state. The time to shutdown the computer system can also be reduced because it is not necessary to back up information from RAM to non-volatile memory.

The preferred embodiment of the present invention, non-volatile memory system for instant-on, is thus described. While the present invention has been described in particular embodiments, it should be appreciated that the present invention should not be construed as limited by such embodiments, but rather construed according to the below claims.

What is claimed is:

1. A computer system using non-volatile memory in lieu of random access memory, said computer system comprising:
   a bus;
   a processor coupled to said bus, wherein said processor comprises non-volatile processor registers; and
   a non-volatile main memory coupled to said bus, said non-volatile main memory for storing operating system software, application software and data used by said processor when said computer system is operating after bootup;

wherein said operating system software and said application software are executed by said processor while remaining resident in said non-volatile main memory; and wherein operating system software and application software used by said computer system after bootup are retained in an executable state within said non-volatile main memory when said computer system is powered off.

2. The computer system of claim 1 comprising:

a non-volatile memory cache coupled to said bus, wherein said non-volatile memory cache functions as second level memory to said non-volatile main memory in a memory hierarchy.

3. The computer system of claim 1 wherein said non-volatile main memory comprises FeRAM.

4. The computer system of claim 1 wherein said non-volatile main memory comprises flash memory.

5. The computer system of claim 1 wherein read/write lines are coupled to said non-volatile main memory for reading and writing information to and from said non-volatile main memory.

6. A computer system using non-volatile memory in lieu of random access memory, said computer system comprising:

a bus;

a processor coupled to said bus, wherein said processor comprises non-volatile registers;

a main memory coupled to said bus; and a memory cache coupled to said bus, wherein said memory cache functions as second level memory to said main memory in a memory hierarchy.

7. The computer system of claim 6 wherein said main memory is a non-volatile main memory comprising non-volatile memory for storing operating system software, application software and data used by said processor when said computer system is operating after bootup, wherein said operating system software and said application software are executed by said processor while remaining resident in said non-volatile main memory, and wherein operating system software and application software used by said computer system after bootup are retained in an executable state within said non-volatile main memory when said computer system is powered off.

8. The computer system of claim 7 wherein read/write lines are coupled to said non-volatile main memory for reading and writing information to and from said non-volatile main memory.

9. The computer system of claim 7 wherein said memory cache is a non-volatile memory cache comprising non-volatile memory.

10. The computer system of claim 9 wherein said non-volatile main memory, said non-volatile memory cache, and said non-volatile processor registers comprise FeRAM.

11. The computer system of claim 9 wherein said non-volatile main memory, said non-volatile memory cache, and said non-volatile processor registers comprise flash memory.

12. A method for booting up and operating a computer system using non-volatile memory in lieu of random access memory, said method comprising the steps of:

a) during bootup, executing operating system software stored in a non-volatile main memory;

b) during operation subsequent to said bootup, executing operating system software and application software resident in said non-volatile main memory, wherein said steps of executing comprise reading and writing information to and from said non-volatile main memory and wherein said steps of executing are performed using a central processing unit comprising non-volatile processor registers; and c) storing said operating system software and said application software in an executable state in said non-volatile main memory when said computer system is powered off.

13. The method as recited in claim 12 wherein said step b) further comprises the step of:

b1) storing a portion of said application software in a non-volatile memory cache functioning as second level memory to said non-volatile main memory in a memory hierarchy.

14. The method as recited in claim 12 wherein said non-volatile main memory comprises FeRAM.

15. The method as recited in claim 12 wherein said non-volatile main memory comprises flash memory.

* * * * *